(12) United States Patent (10) Patent No.: US 12,666,329 B2
Lu et al. (45) Date of Patent: Jun. 23, 2026

(54) METHODS AND APPARATUSES FOR ESTABLISHMENT OF PDU SESSION

(71) Applicant: Telefonaktiebolaget LM Ericsson (publ), Stockholm (SE)

(72) Inventors: Yunjie Lu, Shanghai (CN); Stefan Rommer, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 564 days.

(21) Appl. No.: 17/995,293

(22) PCT Filed: Mar. 17, 2021

(86) PCT No.: PCT/CN2021/081352
§ 371 (c)(1),
(2) Date: Sep. 30, 2022

(87) PCT Pub. No.: WO2021/197076
PCT Pub. Date: Oct. 7, 2021

(65) Prior Publication Data
US 2023/0199595 A1 Jun. 22, 2023

(30) Foreign Application Priority Data

Apr. 1, 2020 (WO) ................ PCT/CN2020/082832
May 19, 2020 (WO) ................ PCT/CN2020/091024

(51) Int. Cl.
*H04W 36/12* (2009.01)
*H04W 84/04* (2009.01)
(52) U.S. Cl.
CPC .......... *H04W 36/12* (2013.01); *H04W 84/042* (2013.01)
(58) Field of Classification Search
CPC .... H04W 36/12; H04W 84/042; H04W 76/12
(Continued)

(56) References Cited

U.S. PATENT DOCUMENTS

2019/0021064 A1* 1/2019 Ryu ..................... H04W 60/06
2019/0215724 A1   7/2019 Talebi Fard et al.
2020/0128450 A1* 4/2020 Wang ..................... H04W 8/14

FOREIGN PATENT DOCUMENTS

CN       110138580 A    8/2019
CN       110167195 A    8/2019
(Continued)

OTHER PUBLICATIONS

3GPP TS 23.288 V16.3.0, "3rd Generation Partnership Project; Technical Specification Group Services and System Aspects; Architecture enhancements for 5G System (5GS) to support network data analytics services (Release 16)," Mar. 2020, 62 pages, 3GPP Organizational Partners.

(Continued)

*Primary Examiner* — Chandrahas B Patel
*Assistant Examiner* — Meheret Woldegebreal Kidane
(74) *Attorney, Agent, or Firm* — Nicholson De Vos Webster & Elliott LLP

(57) ABSTRACT

Methods and apparatuses for establishment of protocol data unit (PDU) session are disclosed. A first network function determines whether a first session management function (SMF) for a PDU session to be established for a terminal device supports insertion/change of a second SMF. When determining that the first SMF for the PDU session does not support insertion/change of the second SMF, the first network function sends, to a second network function, a query request for discovering at least one second SMF that can serve whole public land mobile network (PLMN) to which the first network function belongs. The first network function receives a query response from the second network function.

14 Claims, 5 Drawing Sheets

(58) Field of Classification Search
USPC ......................................................... 370/329
See application file for complete search history.

(56)                 References Cited

FOREIGN PATENT DOCUMENTS

| WO | 2018/228192 A1 | 12/2018 | |
|----|----------------|---------|---|
| WO | 2019/193129 A1 | 10/2019 | |
| WO | WO-2020220319 A1 * | 11/2020 | ......... H04L 65/1045 |

OTHER PUBLICATIONS

3GPP TS 23.501 V16.3.0, "3rd Generation Partnership Project; Technical Specification Group Services and System Aspects; System architecture for the 5G System (5GS); Stage 2 (Release 16)," Sep. 2019, 417 pages, 3GPP Organizational Partners.

3GPP TS 23.501 V16.4.0, "3rd Generation Partnership Project; Technical Specification Group Services and System Aspects; System architecture for the 5G System (5GS); Stage 2 (Release 16)," Mar. 2020, 430 pages, 3GPP Organizational Partners.

3GPP TS 23.502 V16.3.0, "3rd Generation Partnership Project; Technical Specification Group Services and System Aspects; Procedures for the 5G System (5GS); Stage 2 (Release 16)," Sep. 2019, 558 pages, 3GPP Organizational Partners.

3GPP TS 23.502 V16.4.0, "3rd Generation Partnership Project; Technical Specification Group Services and System Aspects; Procedures for the 5G System (5GS); Stage 2 (Release 16)," Mar. 2020, 582 pages, 3GPP Organizational Partners.

3GPP TS 29.500 V16.3.0, "3rd Generation Partnership Project; Technical Specification Group Core Network and Terminals; 5G System; Technical Realization of Service Based Architecture; Stage 3 (Release 16)," Mar. 2020, 65 pages, 3GPP Organizational Partners.

3GPP TS 29.501 V16.3.0, "3rd Generation Partnership Project; Technical Specification Group Core Network and Terminals; 5G System; Principles and Guidelines for Services Definition; Stage 3 (Release 16)," Mar. 2020, 70 pages, 3GPP Organizational Partners.

3GPP TS 29.510 V16.3.0, "3rd Generation Partnership Project; Technical Specification Group Core Network and Terminals; 5G System; Network Function Repository Services; Stage 3 (Release 16)," Mar. 2020, 182 pages, 3GPP Organizational Partners.

3GPP TS 29.571 V16.3.0, "3rd Generation Partnership Project; Technical Specification Group Core Network and Terminals; 5G System; Common Data Types for Service Based Interfaces; Stage 3 (Release 16)," Mar. 2020, 100 pages, 3GPP Organizational Partners.

CN Office Action, including Search Report, Chinese App. No. 202310311927.6, May 29, 2025, 21 pages (11 pages of English Translation and 10 pages of Original Document).

Communication pursuant to Article 94(3) EPC, EP App. No. 21715473.1, Apr. 7, 2025, 09 pages.

Ericsson, "V-SMF Selection for Serving Full PLMN," Jun. 2-12, 2020, 25 pages, 3GPP TSG-CT WG4 Meeting #98e, C4-203570, E-Meeting.

International Search Report and Written Opinion, PCT App. No. PCT/CN2021/081352, Jun. 9, 2021, 19 pages.

Nokia et al., "Support of ETSUN in case of Non 3GPP access", 3GPP Draft; S2-2000472, 3rd Generation Partnership Project (3GPP), Mobile Competence Centre ; 650, Route Des Lucioles; vol. SA WG2, No. Incheon, 2020.

Nokia et al., "Support of ETSUN within and between PLMN(s)", 3GPP Draft; S2-2003496 3rd Generation Partnership Project (3GPP), Mobile Competence Centre, vol. SA WG2, No. e-meeting, 2020, XP051878876.

Office Action, JP App. No. 2022-558461, Jan. 30, 2024, 10 pages (05 pages of English Translation and 05 pages of Original Document).

R. Fielding et al., "Hypertext Transfer Protocol (HTTP/1.1): Caching," Jun. 2014, 43 pages, RFC 7234.

R. Fielding et al., "Hypertext Transfer Protocol (HTTP/1.1): Conditional Requests," Jun. 2014, 28 pages, RFC 7232.

R. Fielding et al., "Hypertext Transfer Protocol (HTTP/1.1): Semantics and Content," Jun. 2014, 101 pages, RFC 7231.

Office Action, IN App. No. 202217055277, Feb. 11, 2026, 07 pages.

* cited by examiner

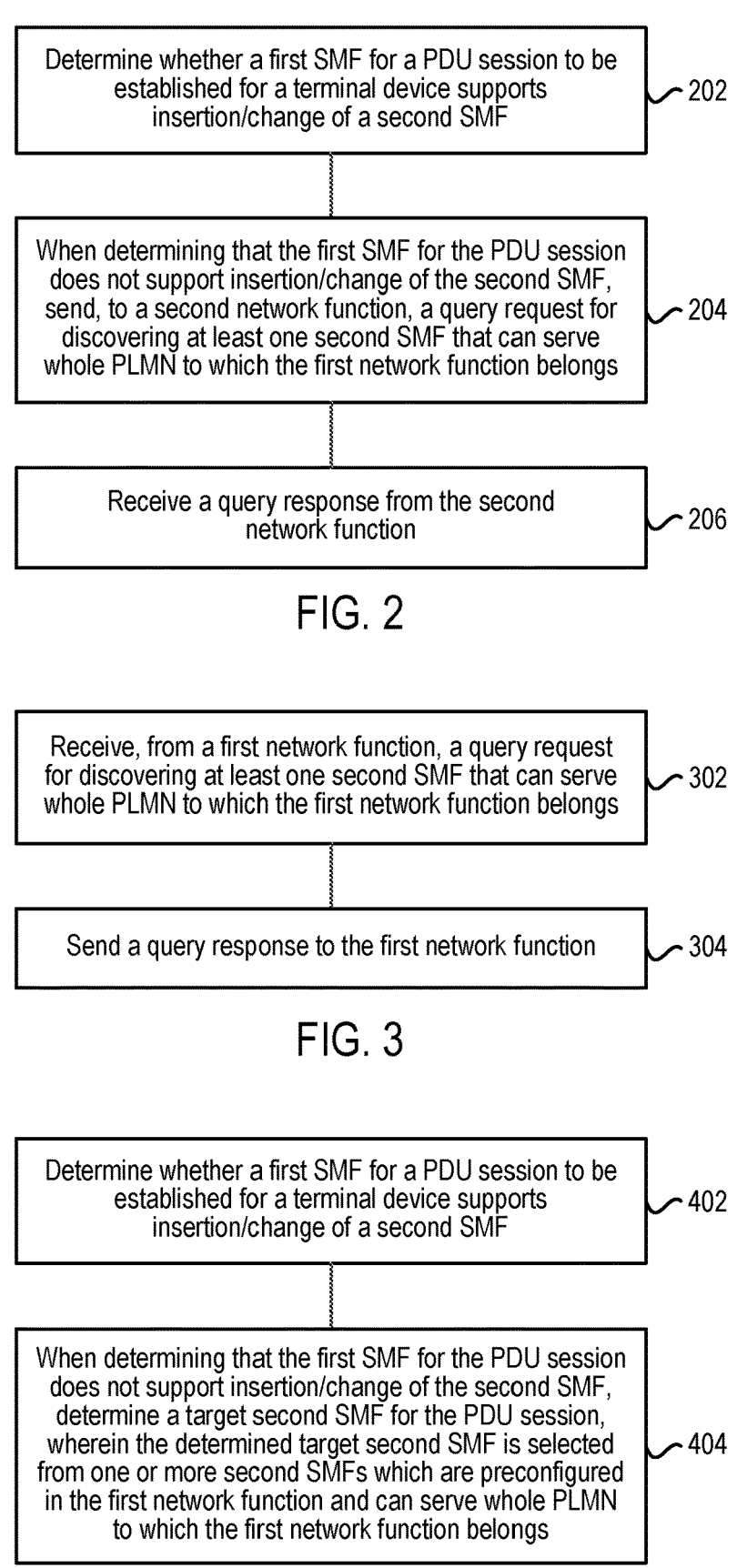

Determine whether a first SMF for a PDU session to be established for a terminal device supports insertion/change of a second SMF ⌐202

When determining that the first SMF for the PDU session does not support insertion/change of the second SMF, send, to a second network function, a query request for discovering at least one second SMF that can serve whole PLMN to which the first network function belongs ⌐204

Receive a query response from the second network function ⌐206

FIG. 2

Receive, from a first network function, a query request for discovering at least one second SMF that can serve whole PLMN to which the first network function belongs ⌐302

Send a query response to the first network function ⌐304

FIG. 3

Determine whether a first SMF for a PDU session to be established for a terminal device supports insertion/change of a second SMF ⌐402

When determining that the first SMF for the PDU session does not support insertion/change of the second SMF, determine a target second SMF for the PDU session, wherein the determined target second SMF is selected from one or more second SMFs which are preconfigured in the first network function and can serve whole PLMN to which the first network function belongs ⌐404

FIG. 4

AMF

NRF

1. GET .../nf-instances?<full-plmn-area=true;nf-type=SMF; other query parameters>

2a. 200 OK (SMF instance(s) serving whole PLMN areas)
2b. 4xx/5xx (ProblemDetails)

700

710

730

Memory

Processor

Communication
I/F

720

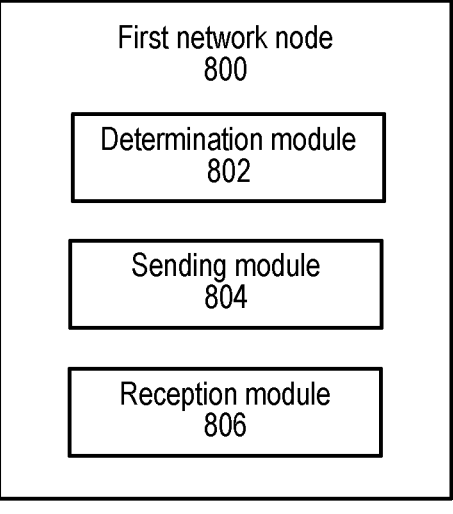
FIG. 8
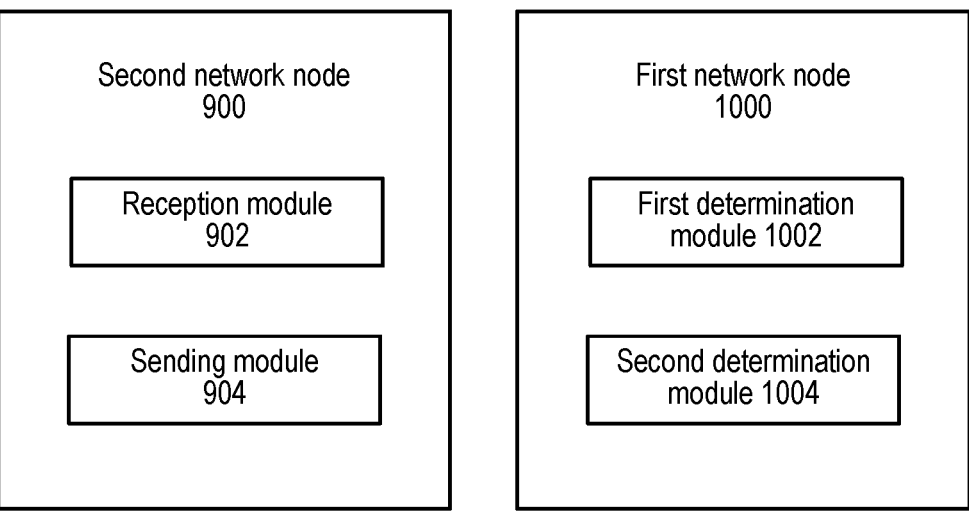
FIG. 9                    FIG. 10

METHODS AND APPARATUSES FOR ESTABLISHMENT OF PDU SESSION

CROSS-REFERENCE TO RELATED APPLICATIONS

This application is a National stage of International Application No. PCT/CN2021/081352, filed Mar. 17, 2021, which claims priority to International Application No. PCT/CN2020/091024, filed May 19, 2020 and which claims priority to International Application No. PCT/CN2020/082832, filed Apr. 1, 2020, which are hereby incorporated by reference.

TECHNICAL FIELD

Embodiments of the disclosure generally relate to communication, and, more particularly, to methods and apparatuses for establishment of protocol data unit (PDU) session.

BACKGROUND

This section introduces aspects that may facilitate better understanding of the present disclosure. Accordingly, the statements of this section are to be read in this light and are not to be understood as admissions about what is in the prior art or what is not in the prior art.

In release 16 (Rel-16), 3rd generation partnership project (3GPP) specified a new feature "deployments topologies with specific session management function (SMF) service areas (DTSSA)" in 5th generation core (5GC). This feature allows access and mobility management function (AMF) to insert/change intermediate or interworking SMF (I-SMF) when the user equipment (UE) moves out of the serving areas of the current serving SMF(s), in order to continue the PDU session(s) served by the old SMF(s).

For home routed PDU sessions, the same mechanism allows the AMF to select a new visited SMF (V-SMF) when the UE moves out of the serving area of the old V-SMF, as specified below in 3GPP technical specification (TS) 23.502 V16.3.0.

4.23 Support of Deployments Topologies with Specific SMF Service Areas 4.23.1 General This clause captures changes to 5GC procedures in other clauses of this specification and new procedures to support deployments topologies with specific SMF Service Areas that are defined in TS 23.501 [2] clause 5.34.

For a Home Routed PDU Session, if a UE moves out of V-SMF serving area in the serving PLMN, the serving AMF can change the V-SMF, in this case, below procedures applies for the V-SMF change (i.e. by replacing the I-SMF with V-SMF).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for establishment of PDU session. In particular, one of the problems to be solved by the disclosure is to prevent a PDU session from being interrupted.

According to a first aspect of the disclosure, there is provided a method performed by a first network function. The method may comprise determining whether a first session management function (SMF), for a protocol data unit (PDU) session to be established for a terminal device supports insertion/change of a second SMF. The method may further comprise, when determining that the first SMF for the PDU session does not support insertion/change of the second SMF, sending, to a second network function, a query request for discovering at least one second SMF that can serve whole public land mobile network (PLMN) to which the first network function belongs. The method may further comprise receiving a query response from the second network function.

In this way, the serving PLMN of the terminal device can be allowed to continue serving the PDU session during mobility of the terminal device, when the first SMF does not support insertion/change of the second SMF.

In an embodiment of the disclosure, the insertion/change of the second SMF may be due to location change of the terminal device in deployments topologies with specific SMF service areas (DTSSA).

In an embodiment of the disclosure, the query request may indicate to preferentially discover the at least one second SMF In an embodiment of the disclosure, the query response may comprise information about the at least one second SMF.

In an embodiment of the disclosure, the query response may comprise information about at least one third SMF that cannot serve the whole PLMN to which the first network function belongs if the at least one second SMF that can serve the whole PLMN is not available.

In an embodiment of the disclosure, the first SMF may be a home SMF (H-SMF) and the second or third SMF may be a visited SMF (V-SMF).

In an embodiment of the disclosure, the first SMF may be an anchor SMF and the second or third SMF may be an intermediate SMF (I-SMF).

In an embodiment of the disclosure, the first network function may be an access and mobility management function (AMF).

In an embodiment of the disclosure, the second network function may be a network repository function (NRF).

In an embodiment of the disclosure, the query request may comprise a first indicator indicating to discover only SMF(s) that can serve the whole PLMN.

In an embodiment of the disclosure, the first indicator may be a query parameter of Boolean type with a value "TRUE" indicating to discover only SMF(s) that can serve the whole PLMN.

In an embodiment of the disclosure, the query request may comprise a second indicator indicating to preferentially discover SMF(s) that can serve the whole PLMN.

In an embodiment of the disclosure, the second indicator may be a query parameter of Boolean type with a value "TRUE" indicating to preferentially discover SMF(s) that can serve the whole PLMN.

In an embodiment of the disclosure, the query request may comprise, as a query parameter for SMF(s) to be discovered, a predefined tracking area identity (TAI) representing the whole PLMN.

According to a second aspect of the disclosure, there is provided a method performed by a second network function. The method may comprise receiving, from a first network function, a query request for discovering at least one second SMF that can serve whole PLMN to which the first network function belongs. The method may further comprise sending a query response to the first network function.

In an embodiment of the disclosure, the query request may indicate to preferentially discover the at least one second SMF.

In an embodiment of the disclosure, the query response may comprise information about the at least one second SMF.

In an embodiment of the disclosure, the query response may comprise information about at least one third SMF that cannot serve the whole PLMN to which the first network function belongs if the at least one second SMF that can serve the whole PLMN is not available.

In an embodiment of the disclosure, the second network function may be an NRF.

In an embodiment of the disclosure, the first network function may be an AMF.

In an embodiment of the disclosure, the query request may comprise a first indicator indicating to discover only SMF(s) that can serve the whole PLMN.

In an embodiment of the disclosure, the first indicator may be a query parameter of Boolean type with a value "TRUE" indicating to discover only SMF(s) that can serve the whole PLMN.

In an embodiment of the disclosure, the query request may comprise a second indicator indicating to preferentially discover SMF(s) that can serve the whole PLMN.

In an embodiment of the disclosure, the second indicator may be a query parameter of Boolean type with a value "TRUE" indicating to preferentially discover SMF(s) that can serve the whole PLMN.

In an embodiment of the disclosure, the query request may comprise, as a query parameter for SMF(s) to be discovered, a predefined TAI representing the whole PLMN.

According to a third aspect of the disclosure, there is provided a method performed by a first network function. The method may comprise determining whether a first SMF for a PDU session to be established for a terminal device supports insertion/change of a second SMF. The method may further comprise, when determining that the first SMF for the PDU session does not support insertion/change of the second SMF, determining a target second SMF for the PDU session. The determined target second SMF may be selected from one or more second SMFs which are preconfigured in the first network function and can serve whole PLMN to which the first network function belongs.

In an embodiment of the disclosure, the insertion/change of the second SMF may be due to location change of the terminal device in DTSSA.

In an embodiment of the disclosure, the first SMF may be an H-SMF and the second SMF is a V-SMF.

In an embodiment of the disclosure, the first SMF may be an anchor SMF and the second SMF may be an I-SMF.

In an embodiment of the disclosure, the first network function may be an AMF.

According to a fourth aspect of the disclosure, there is provided a first network node. The first network node may comprise at least one processor and at least one memory. The at least one memory may contain instructions executable by the at least one processor, whereby the first network node may be operative to determine whether a first SMF for a PDU session to be established for a terminal device supports insertion/change of a second SMF. The first network node may be further operative to, when determining that the first SMF for the PDU session does not support insertion/change of the second SMF, send, to a second network function, a query request for discovering at least one second SMF that can serve whole PLMN to which the first network node belongs. The first network node may be further operative to receive a query response from the second network function.

In an embodiment of the disclosure, the first network node may be operative to perform the method according to the above first aspect.

According to a fifth aspect of the disclosure, there is provided a second network node. The second network node may comprise at least one processor and at least one memory. The at least one memory may contain instructions executable by the at least one processor, whereby the second network node may be operative to receive, from a first network function, a query request for discovering at least one SMF that can serve whole PLMN to which the first network function belongs. The second network node may be further operative to send a query response to the first network function.

In an embodiment of the disclosure, the second network node may be operative to perform the method according to the above second aspect.

According to a sixth aspect of the disclosure, there is provided a first network node. The first network node may comprise at least one processor and at least one memory. The at least one memory may contain instructions executable by the at least one processor, whereby the first network node may be operative to determine whether a first SMF for a PDU session to be established for a terminal device supports insertion/change of a second SMF. The first network node may be further operative to, when determining that the first SMF for the PDU session does not support insertion/change of the second SMF, determine a target second SMF for the PDU session. The determined target second SMF may be selected from one or more second SMFs which are preconfigured in the first network node and can serve whole PLMN to which the first network node belongs.

In an embodiment of the disclosure, the first network node may be operative to perform the method according to the above third aspect.

According to a seventh aspect of the disclosure, there is provided a computer program product. The computer program product may comprise instructions which when executed by at least one processor, cause the at least one processor to perform the method according to any of the above first to third aspects.

According to an eighth aspect of the disclosure, there is provided a computer readable storage medium. The computer readable storage medium may comprise instructions which when executed by at least one processor, cause the at least one processor to perform the method according to any of the above first to third aspects.

According to a ninth aspect of the disclosure, there is provided a first network node. The first network node may comprise a determination module for determining whether a first SMF for a PDU session to be established for a terminal device supports insertion/change of a second SMF. The first network node may further comprise a sending module for, when determining that the first SMF for the PDU session does not support insertion/change of the second SMF, sending, to a second network function, a query request for discovering at least one second SMF that can serve whole PLMN to which the first network node belongs. The first network node may further comprise a reception module for receiving a query response from the second network function.

According to a tenth aspect of the disclosure, there is provided a second network node. The second network node may comprise a reception module for receiving, from a first network function, a query request for discovering at least one SMF that can serve whole PLMN to which the first network function belongs. The second network node may further comprise a sending module for sending a query response to the first network function.

According to an eleventh aspect of the disclosure, there is provided a first network node. The first network node may comprise a first determination module for determining whether a first SMF for a PDU session to be established for a terminal device supports insertion/change of a second SMF. The first network node may further comprise a second determination module for, when determining that the first SMF for the PDU session does not support insertion/change of the second SMF, determining a target second SMF for the PDU session. The determined target second SMF may be selected from one or more second SMFs which are preconfigured in the first network node and can serve whole PLMN to which the first network node belongs.

According to a twelfth aspect of the disclosure, there is provided a method implemented in a communication system. The method may comprise, at a first network function, determining whether a first SMF for a PDU session to be established for a terminal device supports insertion/change of a second SMF. The method may further comprise, at the first network function, when determining that the first SMF for the PDU session does not support insertion/change of the second SMF, sending, to a second network function, a query request for discovering at least one second SMF that can serve whole PLMN to which the first network function belongs. The method may further comprise, at the second network function, receiving the query request from the first network function. The method may further comprise, at the second network function, sending a query response to the first network function. The method may further comprise, at the first network function, receiving the query response from the second network function.

According to a thirteenth aspect of the disclosure, there is provided a communication system. The communication system may comprise a first network node and a second network node. The first network node may be configured to: determine whether a first SMF for a PDU session to be established for a terminal device supports insertion/change of a second SMF; when determining that the first SMF for the PDU session does not support insertion/change of the second SMF, send, to the second network node, a query request for discovering at least one second SMF that can serve whole PLMN to which the first network node belongs; and receive a query response from the second network node. The second network node may be configured to receive the query request from the first network node and send the query response to the first network node.

BRIEF DESCRIPTION OF THE DRAWINGS

These and other objects, features and advantages of the disclosure will become apparent from the following detailed description of illustrative embodiments thereof, which are to be read in connection with the accompanying drawings.

FIG. 2 is a flowchart illustrating a method performed by a first network function according to an embodiment of the disclosure;

FIG. 3 is a flowchart illustrating a method performed by a second network function according to an embodiment of the disclosure;

FIG. 4 is a flowchart illustrating a method performed by a first network function according to an embodiment of the disclosure;

FIG. 8 is a block diagram showing a first network node according to an embodiment of the disclosure;

FIG. 9 is a block diagram showing a second network node according to an embodiment of the disclosure; and FIG. 10 is a block diagram showing a first network node according to an embodiment of the disclosure.

DETAILED DESCRIPTION

Figure 1:
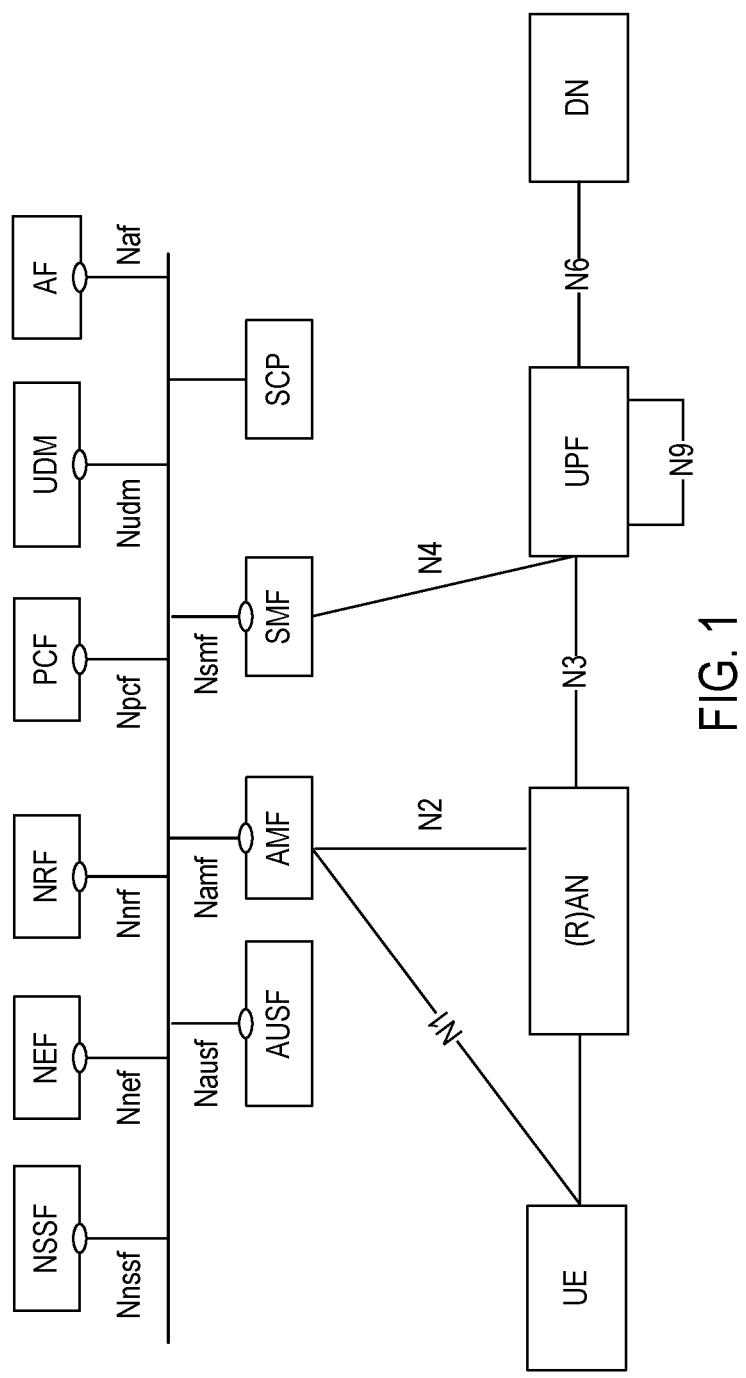
FIG. 1 is a diagram illustrating an exemplary communication system into which an embodiment of the disclosure is applicable.

For the purpose of explanation, details are set forth in the following description in order to provide a thorough understanding of the embodiments disclosed. It is apparent, however, to those skilled in the art that the embodiments may be implemented without these specific details or with an equivalent arrangement.

For the DTSSA feature mentioned above, if the V-SMF has changed, the new V-SMF fetches the session management (SM) context of the PDU session from the old V-SMF, then subsequently invokes PDU Session Update service operation on the H-SMF to pass the information of the new V-SMF in order to setup a new N16 interface, e.g. a new SM Context Identifier (PDU Session Ref uniform resource identifier (URI)) on the new V-SMF, the network function (NF) Instance identifier (ID) of the new V-SMF. The H-SMF stores the received information and targets the N16 interface towards the new V-SMF for subsequent communication for the PDU session. e.g. during UE triggered service request procedure with I-SMF/V-SMF change, as described below in 3GPP TS 23.502 V16.3.0 with reference to FIG. 4.23.4.3-1.

. . .

8a. In the case of I-SMF change, the new I-SMF invokes Nsmf_PDUSession_Update Request (SUPI, PDU Session ID, new I-UPF DL tunnel information, SM Context ID at I-SMF, Access Type, RAT Type, DNAI list supported by the new I-SMF) towards the SMF. The new I-SMF uses the SM Context ID at SMF received from old I-SMF for this service operation.

In the case of I-SMF insertion, the new I-SMF invokes Nsmf_PDUSession_Create Request (new I-UPF DL tunnel information, new I-UPF tunnel endpoint for buffered DL data, SM Context ID at I-SMF, Access Type, RAT type, DNAI list supported by the new I-SMF) towards the SMF.

The SM Context ID at I-SMF is to be used by the SMF for further PDU Session operation, e.g. to notify the new I-SMF of PDU session release. If SM Context ID at the I-SMF exists (i.e. in the case of I-SMF change), the SMF shall replace the SM Context ID at I-SMF.

The new I-UPF tunnel endpoint for buffered DL data is used to establish the forwarding tunnel (from old I-UPF controlled by SMF to new I-UPF controlled by new I-SMF).

The similar mechanism is performed during all UE mobility procedures, including Mobility Registration, N2/Xn based Handover, etc.

The 3GPP has specified that within 5GC, an NF service consumer (e.g. AMF) may discover target NF service producers (e.g. SMF) which support specific services (e.g. PDU session service to establish the PDU session request for a UE) via NRF service.

The NF service producer (e.g. SMF) instance registers its NF profile into the NRF when it is up and running. Alternatively it is registered in NRF by an operations and maintenance (O&M) function. The NF profile includes the necessary information on which services are supported and how the service could be accessed. The NF profile also includes the information to allow the NRF to match/filter the NF instances fulfilling the discovery requests from a NF service consumer. For example, the SMF may indicate the service areas with list of TAIs it can serve when it registers its NF profile in NRF, and the AMF may include the TAI (where UE is located) in the discovery request towards NRF to find the SMF instance(s) that can serve the UE in the current location. An NF also indicates the optional features it supports in the NF profile. For example, an SMF shall indicate the support for DTSSA if it supports.

In order to successfully serve the home routed PDU session with UE mobility, the current 3GPP specification requires DTSSA feature to be supported in both visited PLMN (VPLMN) (e.g. AMF/V-SMF) and home PLMN (HPLMN) (e.g. H-SMF) in case a V-SMF does not cover the full PLMN area: when the UE moves outside of the service area of the current V-SMF, the AMF will select a new V-SMF and the V-SMF updates the H-SMF to set up a new N16 interface for the subsequent communication. The information of the new V-SMF is passed with new information elements (IEs) which are only understood by SMF with DTSSA support. The H-SMF thus also needs DTSSA support to handle these IEs, and to be able to handle a V-SMF change. A Rel-15 H-SMF will be able to support home routed roaming, but cannot support V-SMF change.

If the VPLMN supports DTSSA feature but the H-SMF does not support DTSSA feature, when a new V-SMF is selected, it cannot update the H-SMF using the new IEs. Thus, the H-SMF will still keep the N16 interface towards the old V-SMF which cannot continue serving the UE when the UE moves out of the V-SMF service area. As a result, the PDU session has to be released.

The present disclosure proposes an improved solution for establishment of PDU session. Hereinafter, the solution will be described in detail with reference to FIGS. 1-10.

FIG. 1 is a diagram showing an exemplary communication system into which an embodiment of the disclosure is applicable. As shown, the communication system comprises a user equipment (UE), a (radio) access network ((R)AN), a user plane function (UPF), a data network (DN), an authentication server function (AUSF), an access and mobility management function (AMF), a session management function (SMF), a service communication proxy (SCP), a network slice selection function (NSSF), a network exposure function (NEF), a network repository function (NRF), a policy control function (PCF), a unified data management (UDM) and an application function (AF). The functional description of the above entities is specified in clause 6 of 3GPP TS 23.501 V16.3.0, which is incorporated herein by reference in its entirety.

Note that within the context of this disclosure, the term terminal device (or UE) used herein may also be referred to as, for example, access terminal, mobile station, mobile unit, subscriber station, or the like. It may refer to any (stationary or mobile) end device that can access a wireless communication network and receive services therefrom. By way of example and not limitation, the UE may include a portable computer, an image capture terminal device such as a digital camera, a gaming terminal device, a music storage and playback appliance, a mobile phone, a cellular phone, a smart phone, a tablet, a wearable device, a personal digital assistant (PDA), an integrated or embedded wireless card, an externally plugged in wireless card, or the like.

In an Internet of things (IoT) scenario, a terminal device (or UE) may represent a machine or other device that performs monitoring and/or measurements, and transmits the results of such monitoring and/or measurements to another terminal device (or UE) and/or a network equipment. In this case, the terminal device (or UE) may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

As used herein, the term "communication system" refers to a system following any suitable communication standards, such as the first generation (1G), 2G, 2.5G, 2.75G, 3G, 4G, 4.5G, 5G communication protocols, and/or any other protocols either currently known or to be developed in the future. Furthermore, the communications between a terminal device and a network node in the communication system may be performed according to any suitable generation communication protocols, including, but not limited to, 1G, 2G, 2.5G, 2.75G, 3G, 4G, 4.5G, 5G communication protocols, and/or any other protocols either currently known or to be developed in the future. In addition, the specific terms used herein do not limit the present disclosure only to the communication system related to the specific terms, which however can be more generally applied to other communication systems.

FIG. 2 is a flowchart illustrating a method performed by a first network function according to an embodiment of the disclosure. The first network function may be an AMF or any other entity having similar functionality. Note that the network function mentioned in this document may be implemented either as a network element on a dedicated hardware, as a software instance running on a dedicated hardware, or as a virtualized function instantiated on an appropriate platform, e.g. on a cloud infrastructure. At block 202, the first network function determines whether a first SMF for a PDU session to be established for a terminal device supports insertion/change of a second SMF. The first SMF may also be called an SMF of the first type and the second SMF may also be called an SMF of the second type. For example, the insertion/change of the second SMF may be due to location change of the terminal device in DTSSA. As an example, the first SMF may be an H-SMF and the second SMF may be a V-SMF. In this case, the terminal device is in home routed roaming. As another example, the first SMF may be an anchor SMF and the second SMF may be an I-SMF. In this case, the terminal device is in non-roaming status. For any one of the above examples, the first network function may query an NRF (or any other entity having similar functionality) for the features supported by the first SMF. The determination at block 202 may be performed according to whether the supported features include the feature (e.g. DTSSA) supporting insertion/change of the second SMF.

When determining that the first SMF for the PDU session does not support insertion/change of the second SMF, the first network function sends, at block 204, to a second network function, a query request for discovering at least one second SMF that can serve whole PLMN to which the first network function belongs. The second network function may be an NRF or any other entity having similar functionality. In the above example where the first SMF is an H-SMF and the second SMF is a V-SMF, the PLMN to which the first network function belongs is the VPLMN.

As a first option, the query request may comprise a first indicator indicating to discover only SMF(s) that can serve the whole PLMN. As an exemplary example, the first indicator may be a query parameter of Boolean type with a value "TRUE" indicating to discover only SMF(s) that can serve the whole PLMN. As a second option, the query request may comprise, as a query parameter for SMF(s) to be discovered, a predefined TAI representing the whole PLMN. Note that various other options may be used instead as long as the second network function can be requested by the query request to discover only SMF(s) that can serve the whole PLMN.

At block 206, the first network function receives a query response from the second network function. For example, in case the at least one second SMF is deployed in the PLMN, the query response may comprise information about the at least one second SMF. With the method shown in FIG. 2, the serving PLMN of the terminal device can be allowed to continue serving the PDU session during mobility of the terminal device, when the first SMF does not support insertion/change of the second SMF.

It is also possible that query request indicates to preferentially discover the at least one second SMF. As a first option, the query request may comprise a second indicator indicating to preferentially discover SMF(s) that can serve the whole PLMN. As an exemplary example, the second indicator may be a query parameter of Boolean type with a value "TRUE" indicating to preferentially discover SMF(s) that can serve the whole PLMN. As a second option, the query request may comprise, as a query parameter for SMF(s) to be discovered, a predefined TAI representing the whole PLMN. Note that various other options may be used instead as long as the second network function can be requested by the query request to preferentially discover SMF(s) that can serve the whole PLMN.

Correspondingly, in case the at least one second SMF is deployed in the PLMN, the query response may comprise information about the at least one second SMF. In case the at least one second SMF is not deployed in the PLMN, the query response may comprise information about at least one third SMF that cannot serve the whole PLMN to which the first network function belongs, since the at least one second SMF that can serve the whole PLMN is not available. In this case, the at least one third SMF may match one or more other query parameters contained in the query request.

FIG. 3 is a flowchart illustrating a method performed by a second network function according to an embodiment of the disclosure. The second network function may be an NRF or any other entity having similar functionality. At block 302, the second network function receives, from a first network function, a query request for discovering at least one second SMF that can serve whole PLMN to which the first network function belongs. The first network function may be an AMF or any other entity having similar functionality. Block 302 corresponds to block 204. As described above with respect to block 204, as the first option, the query request may comprise a first indicator indicating to discover only SMF(s) that can serve the whole PLMN. For this option, in response to the query request containing such indicator, the second network function may search for SMF(s) whose registered information do not contain specific served TAI(s), which means the whole PLMN can be served. As the second option, the query request may comprise, as a query parameter for SMF(s) to be discovered, a predefined TAI representing the whole PLMN. For this option, in response to the query request containing the predefined TAI, the second network function may search for SMF(s) whose registered information contains the predefined TAI.

At block 304, the second network function sends a query response to the first network function. For example, in case information about the at least one second SMF (e.g. the NF profile thereof) is registered in the second network function, the query response may comprise such information.

As described above, it is also possible that query request indicates to preferentially discover the at least one second SMF. As a first option, the query request may comprise a second indicator indicating to preferentially discover SMF(s) that can serve the whole PLMN. As an exemplary example, the second indicator may be a query parameter of Boolean type with a value "TRUE" indicating to preferentially discover SMF(s) that can serve the whole PLMN. For this option, in response to the query request containing such indicator, the second network function may preferentially search for SMF(s) whose registered information do not contain specific served TAI(s), which means the whole PLMN can be served. As a second option, the query request may comprise, as a query parameter for SMF(s) to be discovered, a predefined TAI representing the whole PLMN. For this option, in response to the query request containing the predefined TAI, the second network function may preferentially search for SMF(s) whose registered information contains the predefined TAI.

For both options, in case the at least one second SMF is deployed in the PLMN, the query response may comprise information about the at least one second SMF. In case the at least one second SMF is not deployed in the PLMN, the query response may comprise information about at least one third SMF that cannot serve the whole PLMN to which the first network function belongs, since the at least one second SMF that can serve the whole PLMN is not available. In this case, the at least one third SMF may match one or more other query parameters contained in the query request.

FIG. 4 is a flowchart illustrating a method performed by a first network function according to an embodiment of the disclosure. The first network function may be an AMF or any other entity having similar functionality. At block 402, the first network function determines whether a first SMF for a PDU session to be established for a terminal device supports insertion/change of a second SMF. Block 402 is the same as block 202 and its details are omitted here. When determining that the first SMF for the PDU session does not support insertion/change of the second SMF, the first network function determines a target second SMF for the PDU session at block 404. The determined target second SMF is selected from one or more second SMFs which are preconfigured in the first network function and can serve whole PLMN to which the first network function belongs. In this way, the serving PLMN of the terminal device can be allowed to continue serving the PDU session during mobility of the terminal device, when the first SMF does not support insertion/change of the second SMF.

Figure 5:
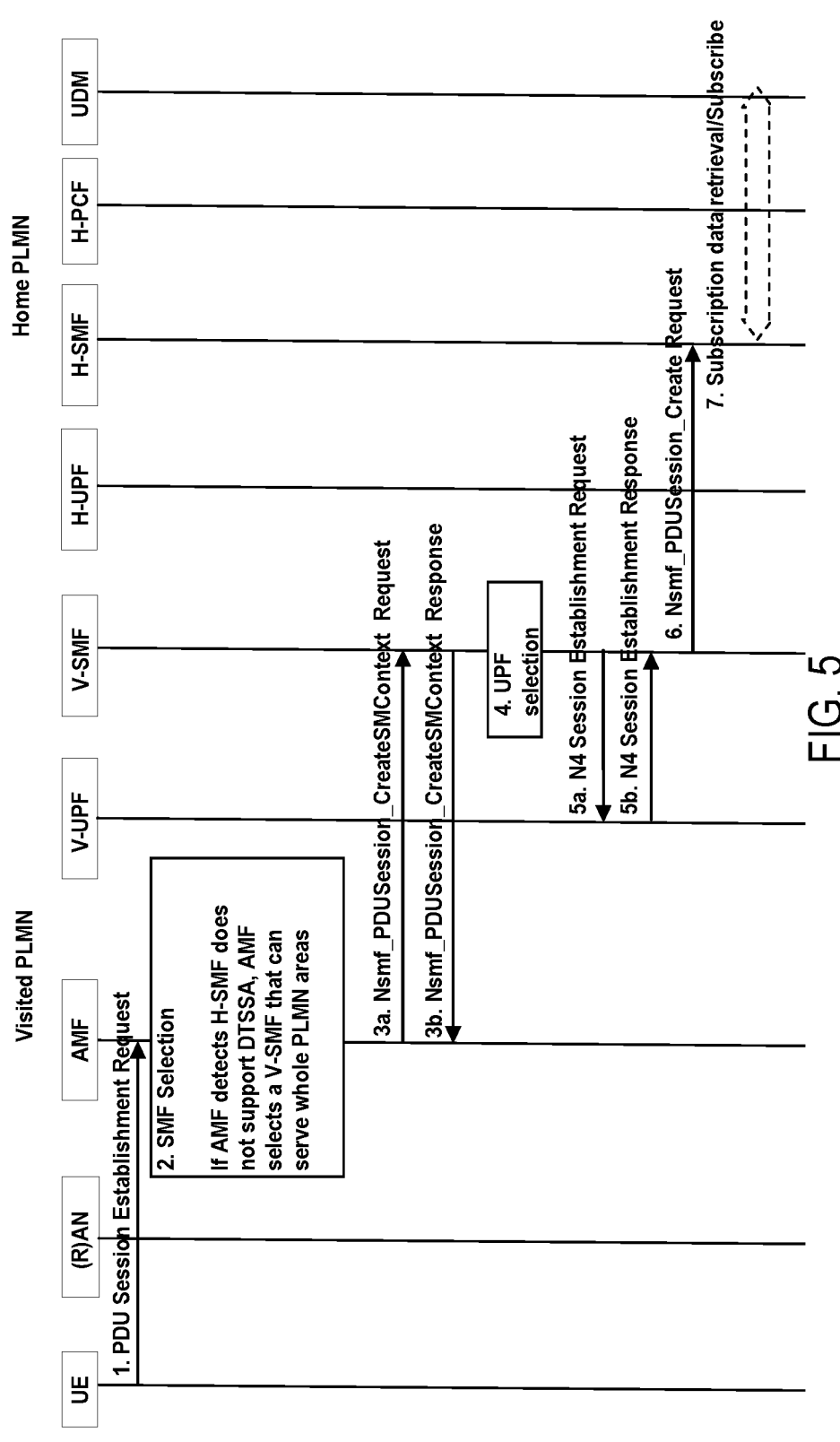
FIG. 5 is a flowchart illustrating an exemplary process according to an embodiment of the disclosure.

FIG. 5 is a flowchart illustrating an exemplary process according to an embodiment of the disclosure. As shown, this process relates to a home routed roaming scenario and involves nine entities: a UE, a (R)AN, an AMF, a visited UPF (V-UPF), a V-SMF, a home UPF (H-UPF), an H-SMF, a home PCF (H-PCF) and a UDM. At step 1, the UE sends a PDU Session Establishment Request to the AMF via the (R)AN. At step 2, the AMF performs SMF selection. If the AMF detects that the H-SMF does not support DTSSA, the AMF selects a V-SMF that can serve whole PLMN areas. This allows the visited PLMN to continue serving the Home Routed PDU session during UE mobility, when the H-SMF does not support DTSSA feature.

Figures 6, 7:
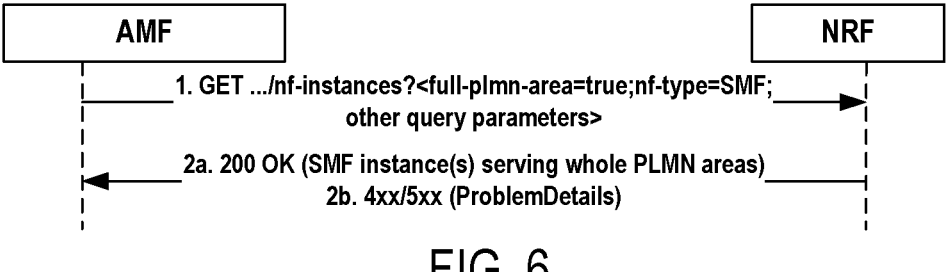
FIG. 6 is a flowchart illustrating an exemplary process according to an embodiment of the disclosure.
FIG. 7 is a block diagram showing an apparatus suitable for use in practicing some embodiments of the disclosure.

Specifically, the visited PLMN may deploy one or more V-SMF(s) which can serve the full or whole PLMN areas and the V-SMF(s) may register in an NRF indicating that they can serve the full PLMN areas. In response to the Home Routed PDU Session Establishment Request from the roaming UE, the AMF may select a H-SMF for the PDU Session via an NRF in the home PLMN. During the H-SMF discovery, the AMF can learn the optional features (e.g. DTSSA) supported by the H-SMF. When the H-SMF does not support DTSSA, the AMF select a V-SMF that can serve the full PLMN areas by any one of the following options. As the first option, as shown in FIG. 6, the AMF may include a new flag ("full-plmn-area" set to "TRUE") in the NRF discovery request indicating that only SMF(s) that can serve the full PLMN areas shall be returned. The NRF may process the new flag and browse all registered SMF instances and pick up only the ones which can serve the full PLMN areas. As the second option, a special TAI (e.g. PLMN_FULL_AREA_TAI with special value) may be defined, which stands for all the areas of the PLMN. The SMF(s) may register this PLMN_FULL_AREA_TAI as serving area and the AMF may use this PLMN_FUL-L_AREA_TAI as a query parameter to find the SMF instance(s). As the third option, all V-SMFs serving the full PLMN areas may be preconfigured in all AMFs.

At step 3a, the AMF sends an Nsmf_PDUSession_CreateSMContext Request to the V-SMF. At step 3b, the V-SMF sends an Nsmf_PDUSession_CreateSMContext Response to the AMF. At step 4, the V-SMF performs UPF selection. At step 5a, the V-SMF sends an N4 Session Establishment Request to the V-UPF. At step 5b, the V-UPF sends an N4 Session Establishment Response to the V-SMF. At step 6, the V-SMF sends an Nsmf_PDUSession_Create Request to the H-SMF. At step 7, the H-SMF performs subscription data retrieval from the UDM. Note that FIG. 6 only illustrates part of the UE-requested PDU Session Establishment procedure for home-routed roaming scenarios and steps 1 and 3-7 may be the same as corresponding steps of FIG. 4.3.2.2.2-1 of 3GPP TS 23.502 V16.3.0.

Based on the process described above, the following changes are proposed to be made to 3GPP TS 23.501 V16.4.0. Note that the updates compared to this technical specification are underlined for ease of recognition.

5.34 Support of Deployments Topologies with Specific SMF Service Areas 6.3.2 SMF Discovery and Selection The SMF selection functionality is supported by the AMF and SCP and is used to allocate an SMF that shall manage the PDU Session. The SMF selection procedures are described in clause 4.3.2.2.3 of TS 23.502 [3].

The SMF discovery and selection functionality follows the principles stated in clause 6.3.1.

If the AMF does discovery, the AMF shall utilize the NRF to discover SMF instance(s) unless SMF information is available by other means, e.g. locally configured on AMF. The AMF provides UE location information to the NRF when trying to discover SMF instance(s). The NRF provides NF profile(s) of SMF instance(s) to the AMF. In addition, the NRF also provides the SMF service area of SMF instance(s) to the AMF. The SMF selection functionality in the AMF selects an SMF instance and an SMF service instance based on the available SMF instances obtained from NRF or on the configured SMF information in the AMF.

NOTE 1: Protocol aspects of the access to NRF are specified in TS 29.510 [58].

The SMF selection functionality is applicable to both 3GPP access and non-3GPP access.

The SMF selection for Emergency services is described in clause 5.16.4.5.

The following factors may be considered during the SMF selection:

a) Selected Data Network Name (DNN). In the case of the home routed roaming, the DNN is not applied for the V-SMF selection.

b) S-NSSAI of the HPLMN (for non-roaming and home-routed roaming scenarios), and S-NSSAI of the VPLMN (for roaming with local breakout and home-routed roaming scenarios).

c) NSI-ID.

NOTE 2: The use of NSI-ID in the network is optional and depends on the deployment choices of the operator. If used, the NSI ID is associated with S-NSSAI.

d) Access technology being used by the UE.

e) Support for Control Plane CIoT 5GS Optimisation.

f) Subscription information from UDM, e.g.

per DNN: whether LBO roaming is allowed.

per S-NSSAI: the subscribed DNN(s).

per (S-NSSAI, subscribed DNN): whether LBO roaming is allowed.

per (S-NSSAI, subscribed DNN): whether EPC interworking is supported.

per (S-NSSAI, subscribed DNN): whether selecting the same SMF for all PDU sessions to the same S-NSSAI and DNN is required.

g) Void.

h) Local operator policies.

NOTE 3: These policies can take into account whether the SMF to be selected is an I-SMF or a V-SMF or a SMF.

i) Load conditions of the candidate SMFs.

j) Analytics (i.e. statistics or predictions) for candidate SMFs' load as received from NWDAF (see TS 23.288 [86]), if NWDAF is deployed.

k) UE location (i.e. TA).

l) Service Area of the candidate SMFs.

m) Capability of the SMF to support a MA PDU Session.

n) If interworking with EPS is required.

To support the allocation of a static IPv4 address and/or a static IPv6 prefix as specified in clause 5.8.2.2.1, a dedicated SMF may be deployed for the indicated combination of DNN and S-NSSAI and registered to the NRF, or provided by the UDM as part of the subscription data.

In the case of delegated discovery, the AMF, shall send all the available factors a)-d), k) and n) to the SCP.

In addition, the AMF may indicate to the SCP which NRF to use (in case of NRF dedicated to the target slice).

If there is an existing PDU Session and the UE requests to establish another PDU Session to the same DNN and S-NSSAI of the HPLMN, and the UE subscription data indicates the support for interworking with EPS for this DNN and S-NSSAI of the HPLMN or UE subscription data indicates the same SMF shall be selected for all PDU sessions to the same S-NSSAI, DNN, the same SMF in non roaming and LBO case or the same H-SMF in home routed roaming case, shall be selected. In addition, if the UE Context in the AMF provides a SMF ID for an existing PDU session to the same DNN, S-NSSAI, the AMF uses the stored SMF ID for the additional PDU Session. In any such a case where the AMF can determine which SMF should be selected, if delegated discovery is used, the AMF shall indicate a desired NF Instance ID so that the SCP is able to route the message to the relevant SMF. Otherwise, if UE subscription data does not indicate the support for interworking with EPS for this DNN and S-NSSAI, a different SMF in non roaming and LBO case or a different H-SMF in home routed roaming case, may be selected. For example, to support a SMF load balancing or to support a graceful SMF shutdown (e.g., a SMF starts to no more take new PDU Sessions).

In the home-routed roaming case, the SMF selection functionality selects an SMF in VPLMN based on the S-NSSAI of the VPLMN, as well as an SMF in HPLMN based on the S-NSSAI of the HPLMN. This is specified in clause 4.3.2.2.3.3 of TS 23.502 [3].

When the UE requests to establish a PDU Session to a DNN and an S-NSSAI of the HPLMN, if the UE MM Core Network Capability indicates the UE supports EPC NAS and optionally, if the UE subscription indicates the support for interworking with EPS for this DNN and S-NSSAI of the HPLMN, the selection functionality (in AMF or SCP) selects a combined SMF+PGW-C. Otherwise, a standalone SMF may be selected.

If the UDM provides a subscription context that allows for handling the PDU Session in the VPLMN (i.e. using LBO) for this DNN and S-NSSAI of the HPLMN and, optionally, the AMF is configured to know that the VPLMN has a suitable roaming agreement with the HPLMN of the UE, the following applies:

If the AMF does discovery, the SMF selection functionality in AMF selects an SMF from the VPLMN.

If delegated discovery is used, the SCP selects an SMF from the VPLMN.

If an SMF in the VPLMN cannot be derived for the DNN and S-NSSAI of the VPLMN, or if the subscription does not allow for handling the PDU Session in the VPLMN using LBO, then the following applies:

If the AMF does discovery, both an SMF in VPLMN and an SMF in HPLMN are selected, and the DNN and S-NSSAI of the HPLMN is used to derive an SMF identifier from the HPLMN.

If delegated discovery is used:

The AMF performs discovery and selection of H-SMF from NRF. The AMF may indicate the maximum number of H-SMF instances to be returned from NRF, i.e. SMF selection at NRF.

The AMF sends Nsmf_PDUSession_CreateSMContext Request to SCP, which includes the endpoint (e.g. URI) of the selected H-SMF, and the discovery and selection parameters as defined in this clause, i.e. parameter for V-SMF selection. The SCP performs discovery and selection of the V-SMF and forwards the request to the selected V-SMF.

The V-SMF sends the Nsmf_PDUSession_Create Request towards the H-SMF via the SCP; the V-SMF uses the received endpoint (e.g. URI) of the selected H-SMF to construct the target destination to be addressed. The SCP forwards the request to the H-SMF.

Upon reception of a response from V-SMF, based on the received V-SMF ID the AMF obtains the Service Area of the V-SMF from NRF. The AMF uses the Service Area of the V-SMF to determine the need for V-SMF relocation upon subsequent UE mobility.

If the initially selected SMF in VPLMN (for roaming with LBO) detects it does not understand information in the UE request, it may reject the N11 message (related with a PDU Session Establishment Request message) with a proper N11 cause triggering the AMF to select both a new SMF in the VPLMN and a SMF in the HPLMN (for home routed roaming).

The AMF selects SMF(s) considering support for CIoT 5GS optimisations (e.g. Control Plane CIoT 5GS Optimisation).

Additional details of AMF selection of an I-SMF are described in the clause 5.34.

In the case of home routed scenario, the AMF selects a new V-SMF if it determines that the current V-SMF cannot serve the UE location. The selection/relocation is same as an I-SMF selection/relocation as described in the clause 5.34. In case the AMF detects that the selected H-SMF does not support deployments with specific SMF Service Areas as described in clause 5.34, e.g. does not support V-SMF change, the AMF should discover and select a V-SMF that can serve the whole PLMN.

Furthermore, the following changes are proposed to be made to 3GPP TS 23.502 V16.4.0.

4.23.5.1 PDU Session Establishment Procedure

For non roaming or LBO roaming, it includes the following cases:

If the service area of the selected SMF includes the location where the UE camps, the UE requested PDU Session Establishment procedure is same as described in clause 4.3.2.2.1.

If the service area of the selected SMF does not include the location where the UE camps, the AMF selects an I-SMF that serves the area where UE camps. The UE requested PDU Session Establishment procedure for Home-routed Roaming defined in clause 4.3.2.2.2 is used to establish the PDU Session. Compared to the procedure defined in clause 4.3.2.2.2, the V-SMF and V-UPF are replaced by I-SMF and I-UPF, and H-SMF and H-UPF are replaced by SMF and UPF (PSA) respectively. Also only the S-NSSAI with the value defined by the serving PLMN is sent to the SMF. The I-SMF provides the DNAI list it supports to SMF and the SMF provides the DNAI(s) of interest for this PDU Session to I-SMF based on the DNAI list information received from I-SMF as defined in FIG. 4.23.9.1-1 step 1.

When the delegated discovery is used, the SCP selects the SMF as described in Annex E.

For the Home-Routed roaming case, the UE requested PDU Session Establishment procedure for Home-routed Roaming in clause 4.3.2.2.2 can be reused without change. If the AMF detects the H-SMF does not support DTSSA, the AMF selects a V-SMF that can serve full PLMN areas.

In addition, the following changes are proposed to be made to 3GPP TS 29.510 V16.3.0.

6.2.3.2.3.1 GET

This operation retrieves a list of NF Instances, and their offered services, currently registered in the NRF, satisfying a number of filter criteria, such as those NF Instances offering a certain service name, or those NF Instances of a given NF type (e.g., AMF).

TABLE 6.2.3.2.3.1-1

| | | | | URI query parameters supported by the GET method on this resource | |
|---|---|---|---|---|---|
| Name | Data type | P | Cardinality | Description | Applicability |
| target-nf-type | NFType | M | 1 | This IE shall contain the NF type of the NF Service Producer being discovered. | |
| requester-nf-type | NFType | M | 1 | This IE shall contain the NF type of the NF Service Consumer that is invoking the Nnrf_NFDiscovery service. | |
| requester-nf-instance-id | NfInstanceId | O | 0 . . . 1 | If included, this IE shall contain the NF instance id of the NF service consumer. | Query-Params-Ext2 |
| service-names | array(Service Name) | O | 1 . . . N | If included, this IE shall contain an array of service names for which the NRF is queried to provide the list of NF profiles. The NRF shall return the NF profiles that have at least one NF service matching the NF service names in this list. The NF service names returned by the NRF shall be an interclause of the NF service names requested and the NF service names registered in the NF profile. If not included, the NRF shall return all the NF service names registered in the NF profile. | |
| requester-nf-instance-fqdn | Fqdn | O | 0 . . . 1 | If included, this IE shall contain the FQDN of the NF Service Consumer that is invoking the Nnrf_NFDiscovery service. The NRF shall use this to return only those NF profiles that include at least one NF service containing an entry in the "allowedNfDomains" list (see clause 6.1.6.2.3) that matches the domain of the requester NF. | |
| full-plmn-area | boolean | O | 0 . . . 1 | If included with value "true", the NRF shall only include the SMF(s) that can serve all the areas of the serving network in the result. This IE only applies to NF type "SMF". | |

Considering the embodiment in which query request may indicate to preferentially discover the at least one second SMF as described above, the following changes are proposed to be made to 3GPP TS 29.510 V16.3.0.

6.2.3.2.3.1 GET

This operation retrieves a list of NF Instances, and their offered services, currently registered in the NRF, satisfying a number of filter criteria, such as those NF Instances offering a certain service name, or those NF Instances of a given NF type (e.g., AMF).

TABLE 6.2.3.2.3.1-1

| | | | | URI query parameters supported by the GET method on this resource | |
|---|---|---|---|---|---|
| Name | Data type | P | Cardinality | Description | Applicability |
| target-nf-type | NFType | M | 1 | This IE shall contain the NF type of the NF Service Producer being discovered. | |
| requester-nf-type | NFType | M | 1 | This IE shall contain the NF type of the NF Service Consumer that is invoking the Nnrf_NFDiscovery service. | |
| requester-nf-instance-id | NfInstanceId | O | 0 . . . 1 | If included, this IE shall contain the NF instance id of the NF service consumer. | Query-Params-Ext2 |
| service-names | array(Service Name) | O | 1 . . . N | If included, this IE shall contain an array of service names for which the NRF is queried to provide the list of NF profiles. The NRF shall return the NF profiles that have at least one NF service matching the NF service names in this list. The NF service names returned by the NRF shall be an interclause of the NF service names requested and the NF service names registered in the NF profile. If not included, the NRF shall return all the NF service names registered in the NF profile. Contains unique items. | |

TABLE 6.2.3.2.3.1-1-continued

| | | | | | |
|---|---|---|---|---|---|
| URI query parameters supported by the GET method on this resource | | | | | |
| Name | Data type | P | Cardinality | Description | Applicability |
| requester-nf-instance-fqdn | Fqdn | O | 0 . . . 1 | If included, this IE shall contain the FQDN of the NF Service Consumer that is invoking the Nnrf_NFDiscovery service. The NRF shall use this to return only those NF profiles that include at least one NF service containing an entry in the "allowedNfDomains" list (see clause 6.1.6.2.3) that matches the domain of the requester NF. | |
| . . . | . . . | . . . | . . . | . . . | . . . |
| preferred-full-plmn | boolean | O | 0 . . . 1 | When present, the NRF shall prefer NF profile(s) that can serve the full PLMN (i.e. can serve any TAI in the PLMN), or the NRF shall return other NF profiles if no NF profile serving the full PLMN is found. (NOTE x) | Query-Params-Ext2 |

NOTE 1:

If this parameter is present and no AMF supporting the requested GUAMI is available due to AMF Failure or planned AMF removal, the NRF shall return in the response AMF instances acting as a backup for AMF failure or planned AMF removal respectively for this GUAMI (see clause 6.1.6.2.11). The NRF can detect if an AMF has failed, using the Heartbeat procedure. The NRF will receive a de-registration request from an AMF performing a planned removal.

NOTE 2:

If the combined SMF/PGW-C is requested to be discovered, the NRF shall return in the response the SMF instances registered with the SmfInfo containing pgwFqdn.

NOTE 3:

If a UPF supporting interworking with EPS is requested to be discovered, the NRF shall return in the response the UPF instances registered with the upfInfo containing iwkEpsInd set to true.

NOTE 4:

This attribute has a different semantic than what is defined in clause 6.6.2 of 3GPP TS 29.500 [4], i.e. it is not used to signal optional features of the Nnrf_NFDiscovery Service API supported by the requester NF.

NOTE 5:

The AMF may perform the SMF discovery based on the dnn, snssais and preferred-tai during a PDU session establishment procedure, and the NRF shall return the SMF profiles matching all if possible, or the SMF profiles only matching dnn and snssais. If the SMF profiles only matching dnn and snssais are returned, the AMF shall insert an I-SMF. An SMF may also perform a UPF discovery using this parameter.

NOTE 6:

The SMF may select the P-CSCF close to the UPF by setting the preferred-locality to the value of the locality of the UPF.

NOTE 7:

During EPS to 5GS idle mobility procedure, the NF service consumer (i.e. SMF) discovers the anchor NEF for NIDD using the SCEF ID received from EPS as the value of the NEF ID, as specified in clause 4.11.1.3.3 of 3GPP TS 23.502 [3].

NOTE 8:

The service consumer may include a list of preferred-nf-instance-ids in the query. If so, the NRF shall first check if the NF profiles of the preferred NF instances match the other query parameters, and if so, then the NRF shall return the corresponding NF profiles; otherwise, the NRF shall return a list of candidate NF profiles matching the query parameters other than the preferred-nf-instance-ids. For example, the target AMF may set this query parameter to the SMF Instance ID and I-SMF Instance ID during an inter AMF mobility procedure to select an I-SMF.

NOTE 9:

This parameter may be used by the SCP (with other query parameters) to discover and select a NF service consumer with a default notification subscription supporting the notication type of a notification request (see clause 6.10.3.x of 3GPP TS 29.500 [4]).

NOTE 10:

An S-NSSAI value used in discovery request query parameters shall be considered as matching the S-NSSAI value in the NF Profile or NF Service of a given NF Instance if both the SST and SD components are identical (i.e. an S-NSSAI value where SD is absent, shall not be considered as matching an S-NSSAI where SD is present, regardless if SST is equal in both).

NOTE 11:

The dnn query parameter shall be considered as matching a DNN attribute in the NF Profile of a given NF Instance if:

both contain the same Network Identifier and Operator Identifier;

both contain the same Network Identifier and none contains an Operator Identifier;

the dnn query parameter contains the Network Identifier only, the DNN value in the NF Profile contains both the Network Identifier and Operator Identifier, and both contain the same Network Identifier; or the dnn query parameter contains both the Network Identifier and Operator Identifier, the DNN value in the NF Profile contains the Network Identifier only, both contain the same Network Identifier and the Operator Identifier matches one PLMN of the NF (i.e. plmnList of the NF Profile).

(NOTE x):

For HR roaming, if the V-PLMN requires Deployments Topologies with specific SMF Service Areas (DTSSA) but no H-SMF can be selected supporting V-SMF change, AMF uses this query parameter to select a V-SMF serving the full VPLMN if available.

A.3 Nnrf_NFDiscovery API

```
openapi: 3.0.0
info:
    version: '1.1.0.alpha-4'
    title: 'NRF NFDiscovery Service'
    description: |
        NRF NFDiscovery Service.
        © 2020, 3GPP Organizational Partners (ARIB, ATIS, CCSA, ETSI, TSDSI, TTA, TTC).
        All rights reserved.
externalDocs:
    description: 3GPP TS 29.510 V16.3.0; 5G System; Network Function Repository
Services; Stage 3
    url: 'http://www.3gpp.org/ftp/Specs/archive/29_series/29.510/'
servers:
    - url: '{apiRoot}/nnrf-disc/v1'
      variables:
          apiRoot:
                default: https://example.com
```

-continued

```
        description: apiRoot as defined in clause 4.4 of 3GPP TS 29.501
security:
  - { }
  - oAuth2ClientCredentials:
      -    nnrf-disc
paths:
  /nf-instances:
    get:
      summary: Search a collection of NF Instances
      operationId: SearchNFInstances
      tags:
        - NF Instances (Store)
      parameters:
        - name: Accept-Encoding
          in: header
          description: Accept-Encoding, described in IETF RFC 7231
          schema:
            type: string
          ...
        - name: target-nf-set-id
          in: query
          description: Target NF Set ID
          schema:
            $ref: 'TS29571_CommonData.yaml#/components/schemas/NfSetId'
        - name: target-nf-service-set-id
          in: query
          description: Target NF Service Set ID
          schema:
            $ref: 'TS29571_CommonData.yaml#/components/schemas/NfServiceSetId'
        - name: nef-id
          in: query
          description: NEF ID
          schema:
            $ref: 'TS29510_Nnrf_NFManagement.yaml#/components/schemas/NefId'
        - name: notification-type
          in: query
          description: Notification Type
          schema:
            $ref:
'TS29510_Nnrf_NFManagement.yaml#/components/schemas/NotificationType'
        - name: serving-scope
          in: query
          description: areas that can be served by the target NF
          schema:
            type: array
            items:
              type: string
            minItems: 1
          style: form
          explode: false
        - name: imsi
          in: query
          description: IMSI of the requester UE to search for an appropriate NF (e.g
HSS)
          schema:
            type: string
        - name: preferred-api-versions
          in: query
          description: Preferred API version of the services to be discovered
          content:
            application/json:
              schema:
                type: object
                additionalProperties:
                  type: string
                minProperties: 1
        - name: v2x-support-ind
          in: query
          description: PCF supports V2X
          schema:
            type: boolean
        - name: redundant-gtpu
          in: query
          description: UPF supports redundant gtp-u to be discovered
          schema:
            type: boolean
```

```
                -  name: redundant-transport
                   in: query
                   description: UPF supports redundant transport path to be discovered
                   schema:
                       type: boolean
                -  name: preferred-full-plum
                   in: query
                   description: NF Instance(s) serving the full PLMN are preferred
                   schema:
                       type: boolean
        responses:
             '200':
                 description: Expected response to a valid request
                 content:
                     application/json:
                         schema:
                             $ref: '#/components/schemas/SearchResult'
                 links:
                     search:
                         operationId: RetrieveStoredSearch
                         parameters:
                             searchId: $response.body#/searchId
                         description: >
                             The 'searchId' parameter returned in the response can be used as the
                             'searchId' parameter in the GET request to '/searches/{searchId}'
                     completeSearch:
                         operationId: RetrieveCompleteSearch
                         parameters:
                             searchId: Sresponse.body#/searchId
                         description: >
                             The 'searchId' parameter returned in the response can be used as the
                             'searchId' parameter in the GET request to
'/searches/{searchId}/complete'
                 headers:
                     Cache-Control:
                         description: Cache-Control containing max-age, described in IETF RFC
7234, 5.2
                         schema:
                             type: string
                     ETag:
                         description: Entity Tag containing a strong validator, described in IETF
RFC 7232, 2.3
                         schema:
                             type: string
                     Content-Encoding:
                         description: Content-Encoding, described in IETF RFC 7231
                         schema:
                             type: string
             '307':
                 description: Temporary Redirect
                 headers:
                     Location:
                         description: 'The URI pointing to the resource located on the redirect
target NRF'
                         required: true
                         schema:
                             type: string
             '400':
                 $ref: 'TS29571_CommonData.yaml#/components/responses/400'
             '401':
                 $ref: 'TS29571_CommonData.yaml#/components/responses/401'
             '403':
                 $ref: 'TS29571_CommonData.yaml#/components/responses/403'
             '404':
                 $ref: 'TS29571_CommonData.yaml#/components/responses/404'
             '406':
                 $ref: 'TS29571_CommonData.yaml#/components/responses/406'
             '411':
                 $ref: 'TS29571_CommonData.yaml#/components/responses/411'
             '413':
                 $ref: 'TS29571_CommonData.yaml#/components/responses/413'
             '415':
                 $ref: 'TS29571_CommonData.yaml#/components/responses/415'
             '429':
                 $ref: 'TS29571_CommonData.yaml#/components/responses/429'
             '500':
                 $ref: 'TS29571_CommonData.yaml#/components/responses/500'
             '501':
                 $ref: 'TS29571_CommonData.yaml#/components/responses/501'
```

-continued

```
'503':
    $ref: 'TS29571_CommonData.yaml#/components/responses/503'
default:
    $ref: 'TS29571_CommonData.yaml#/components/responses/default'
```

Based on the above description, at least one aspect of the disclosure provides a method implemented in a communication system. The method may comprise, at a first network function, determining whether a first SMF for a PDU session to be established for a terminal device supports insertion/change of a second SMF. The method may further comprise, at the first network function, when determining that the first SMF for the PDU session does not support insertion/change of the second SMF, sending, to a second network function, a query request for discovering at least one second SMF that can serve whole PLMN to which the first network function belongs. The method may further comprise, at the second network function, receiving the query request from the first network function. The method may further comprise, at the second network function, sending a query response to the first network function. The method may further comprise, at the first network function, receiving the query response from the second network function.

FIG. 7 is a block diagram showing an apparatus suitable for use in practicing some embodiments of the disclosure. For example, any one of the first network node and the second network node described above may be implemented through the apparatus 700. As shown, the apparatus 700 may include a processor 710, a memory 720 that stores a program, and optionally a communication interface 730 for communicating data with other external devices through wired and/or wireless communication.

The program includes program instructions that, when executed by the processor 710, enable the apparatus 700 to operate in accordance with the embodiments of the present disclosure, as discussed above. That is, the embodiments of the present disclosure may be implemented at least in part by computer software executable by the processor 710, or by hardware, or by a combination of software and hardware.

The memory 720 may be of any type suitable to the local technical environment and may be implemented using any suitable data storage technology, such as semiconductor based memory devices, flash memories, magnetic memory devices and systems, optical memory devices and systems, fixed memories and removable memories. The processor 710 may be of any type suitable to the local technical environment, and may include one or more of general purpose computers, special purpose computers, microprocessors, digital signal processors (DSPs) and processors based on multi-core processor architectures, as non-limiting examples.

FIG. 8 is a block diagram showing a first network node according to an embodiment of the disclosure. As shown, the first network node 800 comprises a determination module 802, a sending module 804 and a reception module 806. The determination module 802 may be configured to determine whether a first SMF for a PDU session to be established for a terminal device supports insertion/change of a second SMF, as described above with respect to block 202. The sending module 804 may be configured to, when determining that the first SMF for the PDU session does not support insertion/change of the second SMF, send, to a second network function, a query request for discovering at least one second SMF that can serve whole PLMN to which the first network node belongs, as described above with respect to block 204. The reception module 206 may be configured to receive a query response from the second network function, as described above with respect to block 206.

FIG. 9 is a block diagram showing a second network node according to an embodiment of the disclosure. As shown, the second network node 900 comprises a reception module 902 and a sending module 904. The reception module 902 may be configured to receive, from a first network function, a query request for discovering at least one SMF that can serve whole PLMN to which the first network function belongs, as described above with respect to block 302. The sending module 904 may be configured to send a query response to the first network function, as described above with respect to block 304.

FIG. 10 is a block diagram showing a first network node according to an embodiment of the disclosure. As shown, the first network node 1000 comprises a first determination module 1002 and a second determination module 1004. The first determination module 1002 may be configured to determine whether a first SMF for a PDU session to be established for a terminal device supports insertion/change of a second SMF, as described above with respect to block 402. The second determination module 1004 may be configured to, when determining that the first SMF for the PDU session does not support insertion/change of the second SMF, determine a target second SMF for the PDU session, as described above with respect to block 404. The determined target second SMF may be selected from one or more second SMFs which are preconfigured in the first network node and can serve whole PLMN to which the first network node belongs. The modules described above may be implemented by hardware, or software, or a combination of both.

Based on the above description, at least one aspect of the disclosure provides a communication system. The communication system may comprise a first network node and a second network node. The first network node may be configured to: determine whether a first SMF for a PDU session to be established for a terminal device supports insertion/change of a second SMF; when determining that the first SMF for the PDU session does not support insertion/change of the second SMF, send, to the second network node, a query request for discovering at least one second SMF that can serve whole PLMN to which the first network node belongs; and receive a query response from the second network node. The second network node may be configured to receive the query request from the first network node and send the query response to the first network node.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method performed by a first network function, comprising:
   receiving a protocol data unit (PDU) session establishment request from a terminal device of a location change;
   determining whether a first session management function (SMF), operative with the terminal device, supports deployments topologies with specific SMF service areas (DTSSA) for a PDU session to be established for the terminal device at another SMF;
   in response to determining that the first SMF for the PDU session does not support DTSSA, sending, to a second network function, a query request for discovering a second SMF that can serve a whole public land mobile network (PLMN) of the first network function; and
   receiving a query response from the second network function to the query request regarding discovery of the second SMF and wherein the query response comprises information about a third SMF that cannot serve the whole PLMN, when the second SMF that can serve the whole PLMN is not available.

2. The method according to claim 1, wherein the first SMF is a home SMF (H-SMF) and the second SMF is a visited SMF (V-SMF), wherein the first SMF is an anchor SMF and the second SMF is an intermediate SMF (I-SMF), wherein the first network function is an access and mobility management function (AMF), or any combination thereof.

3. The method according to claim 1, wherein the second network function is a network repository function (NRF).

4. The method according to claim 1, wherein the query request comprises an indicator indicating to discover only SMFs that can serve the whole PLMN and wherein the indicator is a query parameter of Boolean type with a value "TRUE" indicating to discover one or more SMFs that can serve the whole PLMN.

5. The method according to claim 1, wherein the query request comprises an indicator indicating to preferentially discover SMFs that can serve the whole PLMN and wherein the indicator is a query parameter of Boolean type with a value "TRUE" indicating to preferentially discover one or more SMFs that can serve the whole PLMN.

6. The method according to claim 1, wherein the query request comprises, as a query parameter for one or more SMFs to be discovered, a predefined tracking area identity (TAI) representing the whole PLMN.

7. A method performed by a second network function, comprising:
   receiving, from a first network function, a query request, wherein the query request is generated by the first network function upon receiving a protocol data unit (PDU) session establishment request from a terminal device of a location change, wherein the first network function determines whether a first session management function (SMF), operative with the terminal device, supports deployments topologies with specific SMF service areas (DTSSA) for a PDU session to be established for the terminal device at another SMF, and wherein in response to determining that the first SMF for the PDU session does not support DTSSA, generates the query request for discovering a second SMF that can serve a whole public land mobile network (PLMN) of the first network function;

discovering the second SMF; and sending a query response, to the query request, to the first network function regarding discovery of the second SMF and wherein the query response comprises information about a third SMF that cannot serve the whole PLMN, when the second SMF that can serve the whole PLMN is not available.

8. The method according to claim 7, wherein the query request indicates to preferentially discover the second SMF; wherein the query response comprises information about the second SMF; or wherein the query request indicates to preferentially discover the second SMF and the query response comprises information about the second SMF.

9. The method according to claim 7, wherein the second network function is a network repository function (NRF), wherein the first network function is an access and mobility management function (AMF), or wherein the second network function is the NRF and the first network function is the AMF.

10. The method according to claim 7, wherein the query request comprises an indicator indicating to discover only SMFs that can serve the whole PLMN and wherein the indicator is a query parameter of Boolean type with a value "TRUE" indicating to discover one or more SMFs that can serve the whole PLMN.

11. The method according to claim 7, wherein the query request comprises an indicator indicating to preferentially discover SMFs that can serve the whole PLMN and wherein the indicator is a query parameter of Boolean type with a value "TRUE" indicating to preferentially discover one or more SMFs that can serve the whole PLMN.

12. The method according to claim 7, wherein the query request comprises, as a query parameter for SMFs to be discovered, a predefined tracking area identity (TAI) representing the whole PLMN.

13. A network node comprising:

at least one processor; and at least one memory, the at least one memory containing instructions which, when executed by the at least one processor, cause the network node to:

receive a protocol data unit (PDU) session establishment request from a terminal device of a location change;

determine whether a first session management function (SMF), operative with the terminal device, supports deployments topologies with specific SMF service areas (DTSSA) for a PDU session to be established for the terminal device at another SMF;

in response to determining that the first SMF for the PDU session does not support DTSSA, send, to a second network node, a query request for discovering a second SMF that can serve a whole public land mobile network (PLMN) of the network node; and receive a query response from the second network node to the query request regarding discovery of the second SMF and wherein the query response comprises information about a third SMF that cannot serve the whole PLMN, when the second SMF that can serve the whole PLMN is not available.

14. A second network node comprising:

at least one processor; and at least one memory, the at least one memory containing instructions which, when executed by the at least one processor, cause the second network node to:

receive, from a first network node, a query request, wherein the query request is generated by the first network node upon receiving a protocol data unit (PDU) session establishment request from a terminal device of a location change, wherein the first network node determines whether a first session management function (SMF), operative with the terminal device, supports deployments topologies with specific SMF service areas (DTSSA) for a PDU session to be established for the terminal device at another SMF, and wherein in response to a determination that the first SMF for the PDU session does not support DTSSA, generates the query request for discovering a second SMF that can serve a whole public land mobile network (PLMN) of the first network node;

discover the second SMF; and send a query response, to the query request, to the first network node regarding discovery of the second SMF and wherein the query response comprises information about a third SMF that cannot serve the whole PLMN, when the second SMF that can serve the whole PLMN is not available.

\* \* \* \* \*